(12) United States Patent
Sugasawa

(10) Patent No.: US 11,938,622 B2
(45) Date of Patent: Mar. 26, 2024

(54) HOUSING AND JOINT MECHANISM

(71) Applicant: FANUC CORPORATION, Yamanashi (JP)

(72) Inventor: Kounosuke Sugasawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 692 days.

(21) Appl. No.: 17/101,308

(22) Filed: Nov. 23, 2020

(65) Prior Publication Data
US 2021/0178611 A1 Jun. 17, 2021

(30) Foreign Application Priority Data
Dec. 11, 2019 (JP) ................ 2019-223358

(51) Int. Cl.
| | | |
|---|---|---|
| H05K 5/00 | (2006.01) | |
| B01D 46/00 | (2022.01) | |
| B25J 17/02 | (2006.01) | |
| B25J 19/00 | (2006.01) | |
| B65D 1/02 | (2006.01) | |
| B65D 6/02 | (2006.01) | |
| B65D 8/00 | (2006.01) | |
| B65D 53/02 | (2006.01) | |
| H01R 13/512 | (2006.01) | |
| H01R 13/52 | (2006.01) | |

(52) U.S. Cl.
CPC ...... *B25J 17/0258* (2013.01); *B01D 46/0002* (2013.01); *B01D 46/0005* (2013.01); *B25J 19/0075* (2013.01); *B65D 1/0207* (2013.01); *B65D 7/02* (2013.01); *B65D 11/02* (2013.01); *B65D 15/10* (2013.01); *B65D 15/16* (2013.01); *B65D 53/02* (2013.01); *H01R 13/512* (2013.01); *H01R 13/5202* (2013.01); *H01R 13/5213* (2013.01)

(58) Field of Classification Search
CPC .......................... H05K 5/0017; H05K 5/0217
USPC ........................................ 361/807, 809, 810
See application file for complete search history.

(56) References Cited

U.S. PATENT DOCUMENTS

D604,092 S * 11/2009 Kotani ........................ D7/354
D698,593 S * 2/2014 Ishikawa ..................... D7/354
(Continued)

FOREIGN PATENT DOCUMENTS

CN 103210078 * 7/2013 ............ B01L 7/00
CN 103735148 * 4/2014 ............ A47J 27/00
(Continued)

OTHER PUBLICATIONS

Office Action issued in Japanese Patent Application No. 2019-223358 dated Sep. 26, 2023, with English Translation (11 pages).

*Primary Examiner* — Hung S. Bui
(74) *Attorney, Agent, or Firm* — Nakanishi IP Associates, LLC

(57) ABSTRACT

A housing includes: a housing body that contains at least one electromechanical or mechanical component, the housing body including a front plate and a pair of side plates, the plates being connected to a bottom plate in such a manner that the housing body includes an opening; a cover for closing the opening; and a gasket interposed between an edge portion of the housing body and an edge portion of the cover to tightly close an inside of the housing body. An edge portion of each of the side plates has a curved shape.

12 Claims, 14 Drawing Sheets

(56) References Cited

U.S. PATENT DOCUMENTS

| | | | | |
|---|---|---|---|---|
| D803,614 S | * | 11/2017 | Choi | D7/354 |
| 2005/0185381 A1 | * | 8/2005 | Ono | H05K 5/061 |
| | | | | 312/223.1 |
| 2006/0191210 A1 | * | 8/2006 | Hetzer | F16J 15/106 |
| | | | | 52/38 |
| 2017/0182669 A1 | * | 6/2017 | Bordegnoni | B25J 18/04 |
| 2018/0109027 A1 | * | 4/2018 | Kaneko | H01R 13/52 |
| 2018/0288888 A1 | * | 10/2018 | Kaneko | H01R 43/205 |

FOREIGN PATENT DOCUMENTS

| | | | | |
|---|---|---|---|---|
| CN | 209422417 | * | 9/2019 | A61H 11/00 |
| CN | 114710896 | * | 7/2022 | H05K 5/0004 |
| JP | H11-303799 A | | 11/1999 | |
| JP | 2001-162578 A | | 6/2001 | |
| JP | 2005-177929 A | | 7/2005 | |
| JP | 2006-170300 A | | 6/2006 | |
| JP | 2009-095937 A | | 5/2009 | |
| JP | 2017-113873 A | | 6/2017 | |

\* cited by examiner

HOUSING AND JOINT MECHANISM

CROSS-REFERENCE TO RELATED APPLICATIONS

This application is based upon and claims the benefit of priority from the Japanese Patent Application No. 2019-223358, filed Dec. 11, 2019 the entire contents of which are incorporated herein by reference.

FIELD

Embodiments described herein relate generally to a housing and a joint mechanism.

BACKGROUND

An articulated robot apparatus is known as one of industrial machines for performing various assembling and cooperating works. Such an articulated robot apparatus includes a plurality of links and a plurality of joint mechanisms coupling the plurality of links Each joint mechanism is composed of a joint constituting member that pivotably supports a link, a motor for pivoting the link, and a housing that contains components such as a control unit for controlling the motor. The housing of the joint mechanism includes a housing body that has an opening, and a cover to be put over the housing body to close the opening. The cover can be removed to reveal the opening of the housing body and replacement or maintenance can be performed for the motor or the control unit inside the housing body. A gasket is provided to seal between the housing body and the cover to protect the motor, the control unit and the like against dust and moisture.

In the joint mechanism of the articulated robot apparatus described above, a cover attachment portion is arranged in one plane and the housing body has a deep box shape. For replacement of parts or maintenance, it is necessary to remove the cover and insert a tool or a hand of an operator into the housing body. Due to the cover attachment portion being in one plane, however, workability is not necessarily satisfactory because the housing body is deep and the opening is small.

SUMMARY OF INVENTION

Technical Problem

There is a need for enlargement of the opening in the housing and the joint mechanism to improve workability for maintenance.

Solution to Problem

A housing according to one aspect of the disclosure includes: a housing body that contains at least one electromechanical or mechanical component, the housing body including a front plate and a pair of side plates, the plates being connected to a bottom plate in such a manner that the housing body includes an opening; a cover for closing the opening; and a gasket interposed between edge portions of the bottom plate, the front plate, and the pair of side plates of the housing body and an edge portion of the cover to tightly close an inside of the housing body. An edge portion of each of the side plates of the housing body is cut away toward the bottom plate to have a curved shape.

According to the aspect, it is possible to enlarge the opening to improve workability for maintenance.

DETAILED DESCRIPTION

Figure 1:
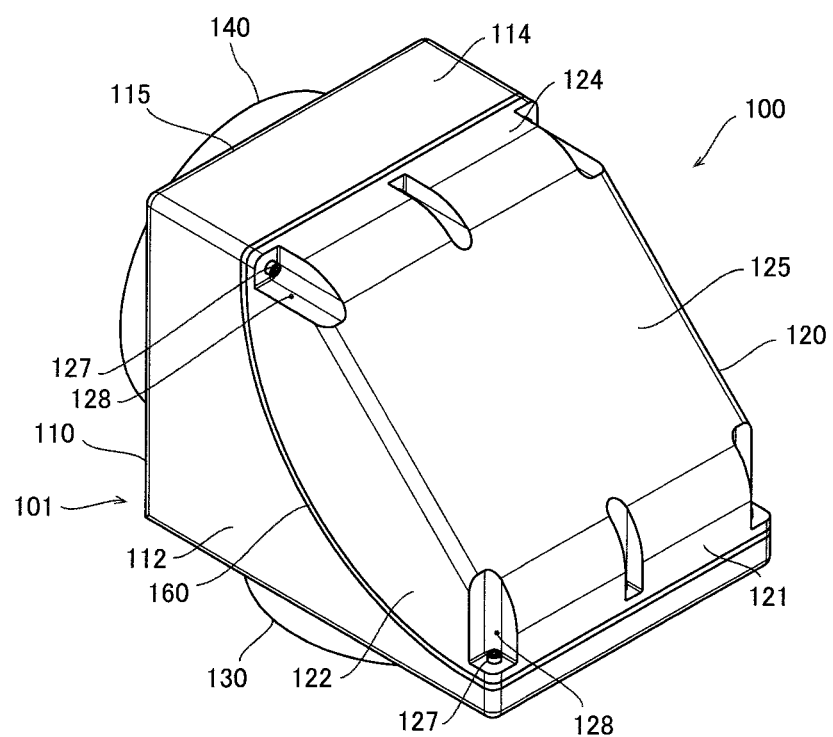
FIG. 1 is a perspective view illustrating a joint mechanism according to a first embodiment.

A joint mechanism and a housing thereof according to an embodiment will now be described with reference to drawings. In the description below, components that have substantially like functions and configurations will have like reference characters and the description will be repeated only as necessary.

A housing according to the embodiment contains at least one electromechanical or mechanical component and is applied in various uses. Description will now be made here as to an instance in which the housing is applied to a joint mechanism coupling links of an articulated robot.

First Embodiment

Figure 2:
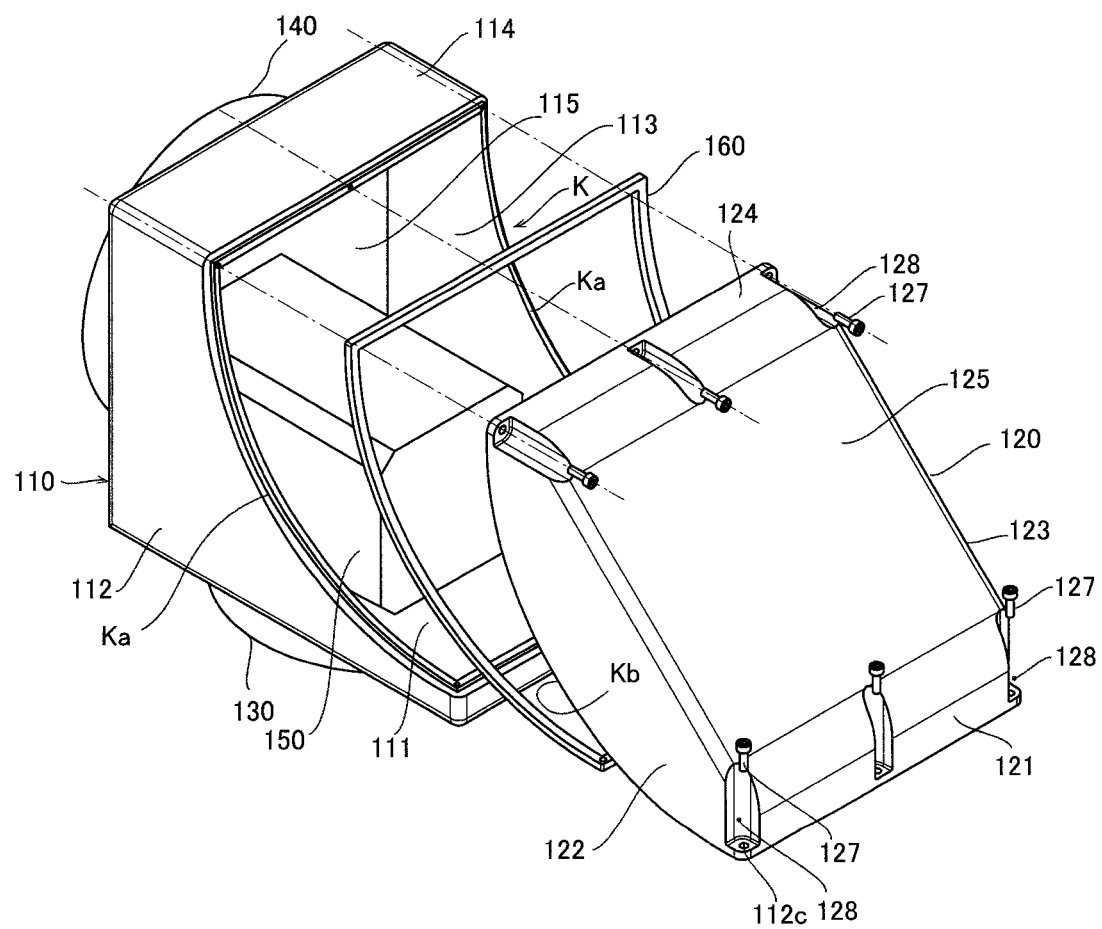
FIG. 2 is an exploded view of a housing in FIG. 1.
Figure 3:
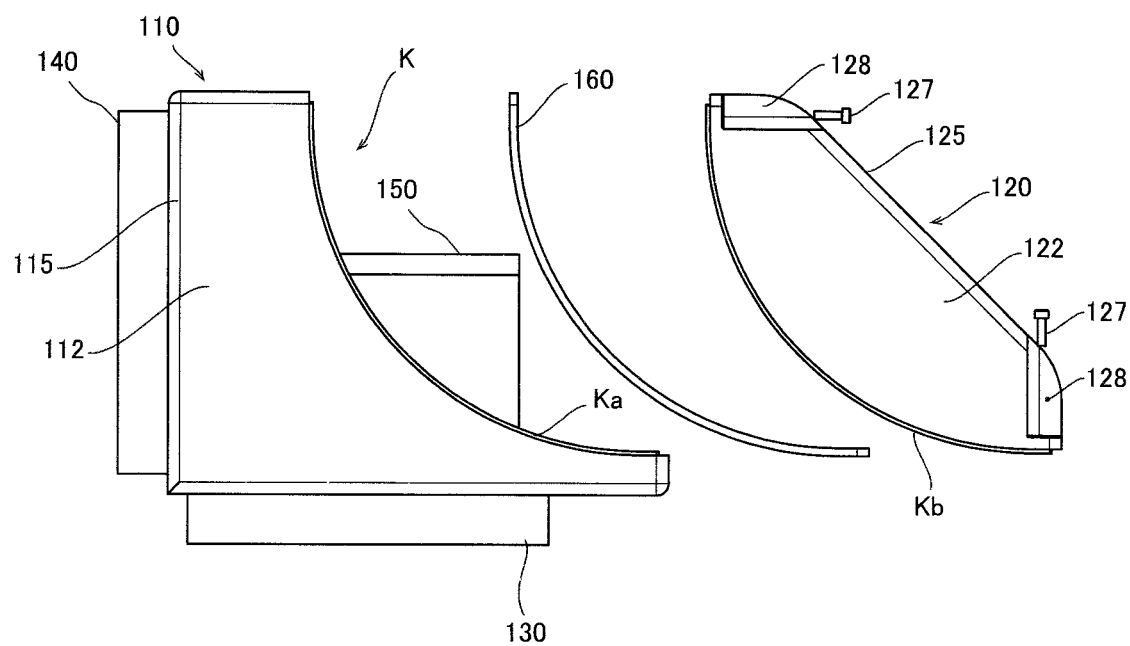
FIG. 3 is a side view of the housing in FIG. 2.

As illustrated in FIGS. 1 to 3, a joint mechanism 100 according to a first embodiment includes joint constituting members 130, 140 such as bearings, each of which is a mechanical component, a motor 150 as an electromechanical component, and a housing 101. The housing 101 consists of a housing body 110, part of which is open and which is made of metal, and a cover 120 that is made of metal or resin and put over the housing body 110 to close an opening K.

The housing body 110 typically includes a rectangular bottom plate (also referred to as a base plate) 111. A front plate 115 and a pair of side plates 112, 113 are connected to the bottom plate 111. The pair of side plates 112, 113 each have a shape similar to a trapezoid, one of interior angles of which is a right angle or a near right angle. Here, edge portions Ka of the side plates 112, 113 each corresponding to an oblique line of the trapezoid is not linear and is formed in a curved shape, or preferably an arcuate shape, which is cut away toward the bottom plate 111 in a large concave shape. In this way, when the cover 120 is removed, the motor 150, which is an electromechanical component, and joint constituting members 130, 140, which are mechanical components, are exposed largely from the opening K of the housing body 110, so that access to the components is facilitated.

A narrow strip-shaped top plate 114 is connected to the pair of side plates 112, 113 and the front plate 115. In this way, the housing body 110 has a rectangular-parallelepiped shape (a box shape), one face of which is open, and which thus consists of five faces. Since the front plate 115 and the pair of side plates 112, 113 are connected to three sides of the bottom plate 111 and the front plate 115, and the pair of side plates 112, 113 are connected together by the top plate 114, more rigidity of the housing body 110 as a boxy body can be secured than the case in which no top plate 114 is provided. Further, the opening K can be made larger than an opening in the case in which the pair of side plates are rectangular or the case in which edge portions Ka of the side plates are linear.

The joint constituting member 140 such as a bearing, which is a mechanical component and rotatably supports a link, is attached to the front plate 115. The joint constituting member 130 such as a bearing that rotatably supports another link, and the motor 150 as an electromechanical component is attached to the bottom plate 111.

The cover 120 has a shape that matches with the opening K of the housing body 110 and the edge portions Ka. A rear end plate 121, a pair of side plates 122, 123, and a top plate 124 are connected to a rectangular and planar oblique plate 125. Edge portions Kb of the pair of side plates 122, 123 each have a curved convex shape that matches with the respective edge portions Ka of the pair of side plates 112, 113 of the housing body 110.

An endless gasket 160 is interposed between the edge portions Ka of the bottom plate 111, the top plate 114, and the pair of side plates 112, 113 of the housing body 110 and the edge portions Kb of the rear end plate 121, the pair of side plates 122, 123, and the top plate 124 of the cover 120 to secure air tightness inside the housing 101. The gasket 160 is typically cut out from a planar sheet and formed into a flat endless shape that has a fixed thickness.

Figure 4A:
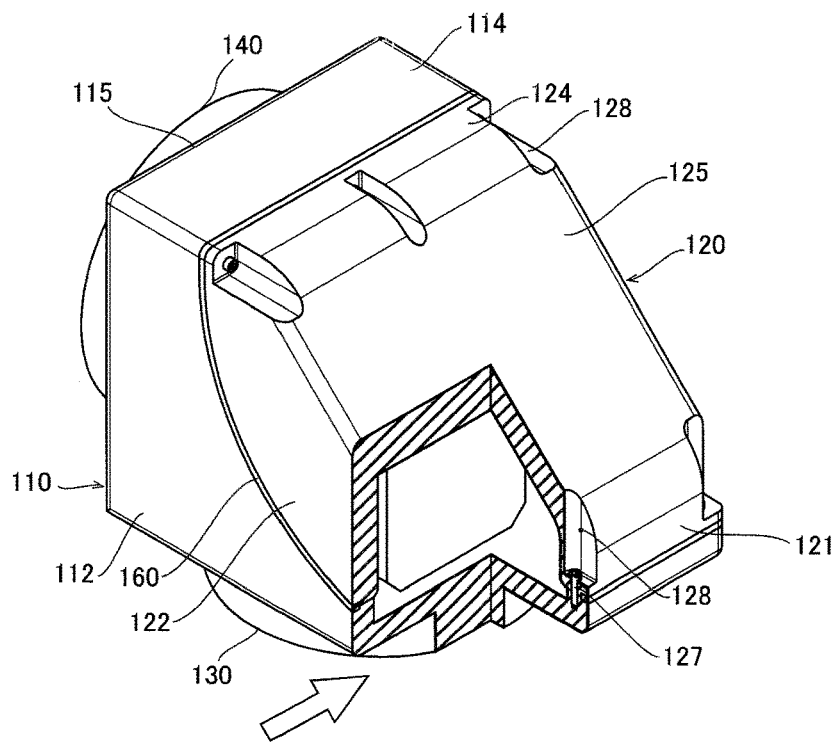
FIG. 4A is a partial cutaway view of a sealing structure of the housing in FIG. 1.
Figure 4B:
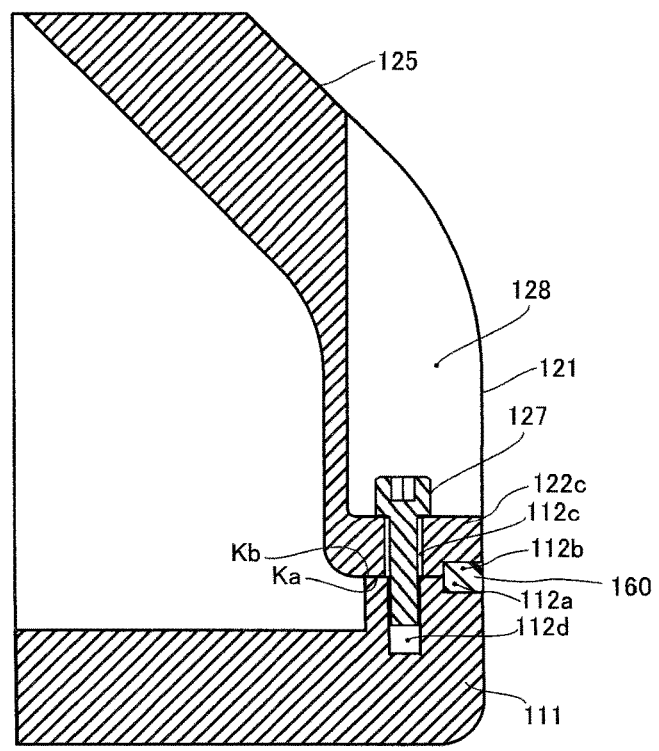
FIG. 4B is an arrow sectional view of FIG. 4A.
Figure 5:
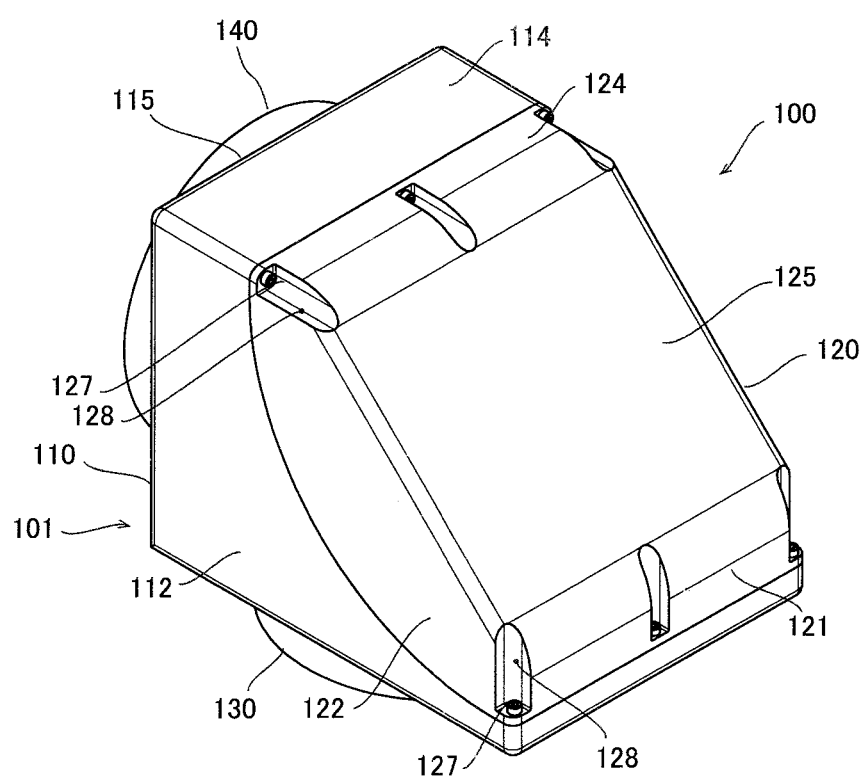
FIG. 5 is a perspective view illustrating a joint mechanism according to the first embodiment.
Figure 6:
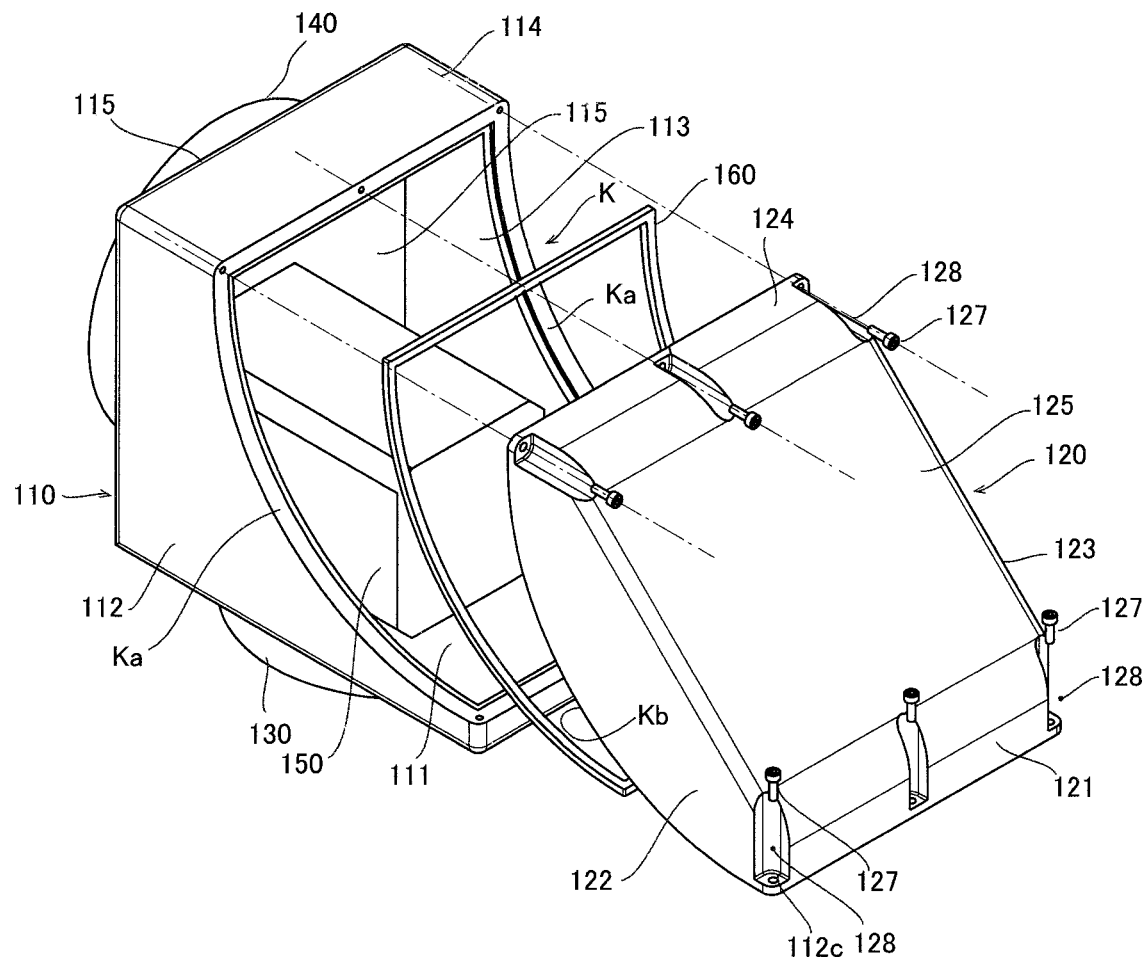
FIG. 6 is an exploded view of the housing in FIG. 5.
Figure 7:
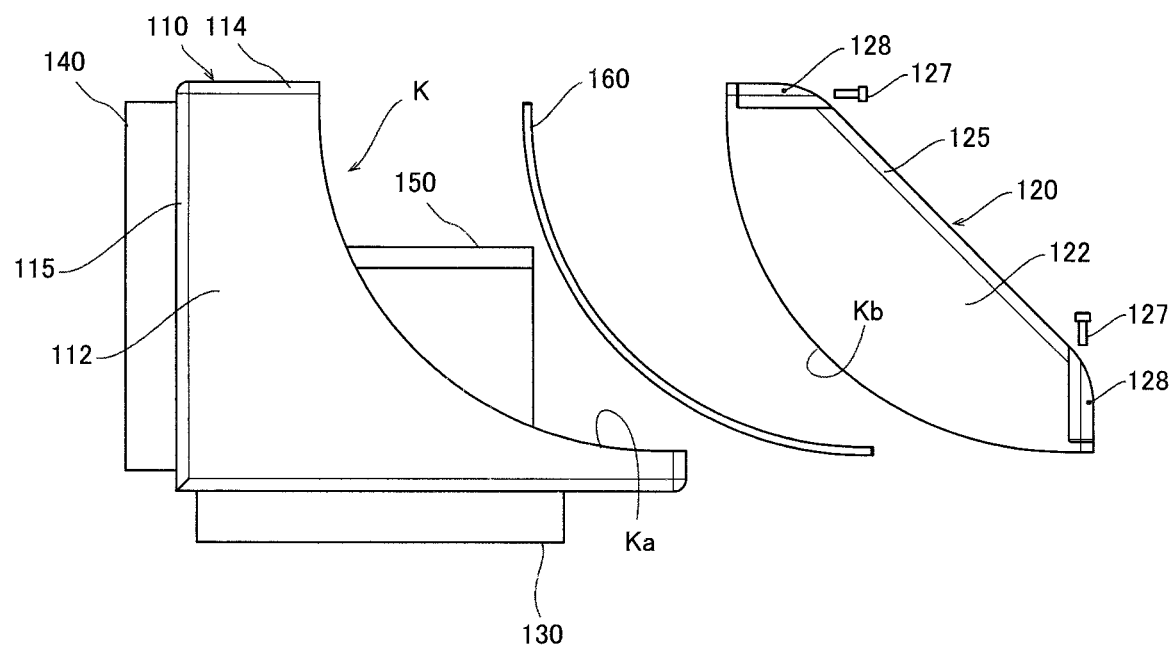
FIG. 7 is a side view of the housing in FIG. 6.
Figure 8A:
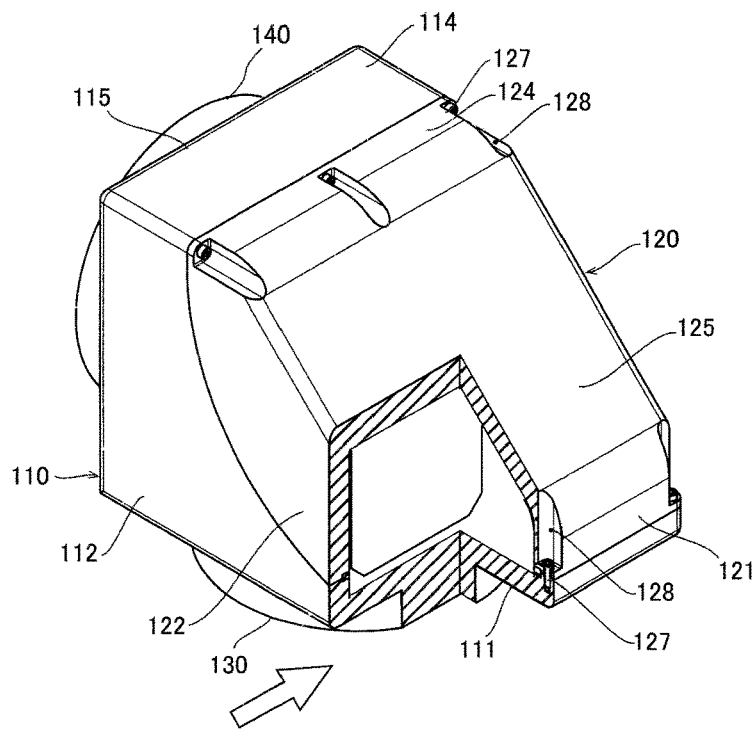
FIG. 8A is a partial cutaway view of the sealing structure of the housing in FIG. 5.
Figure 8B:
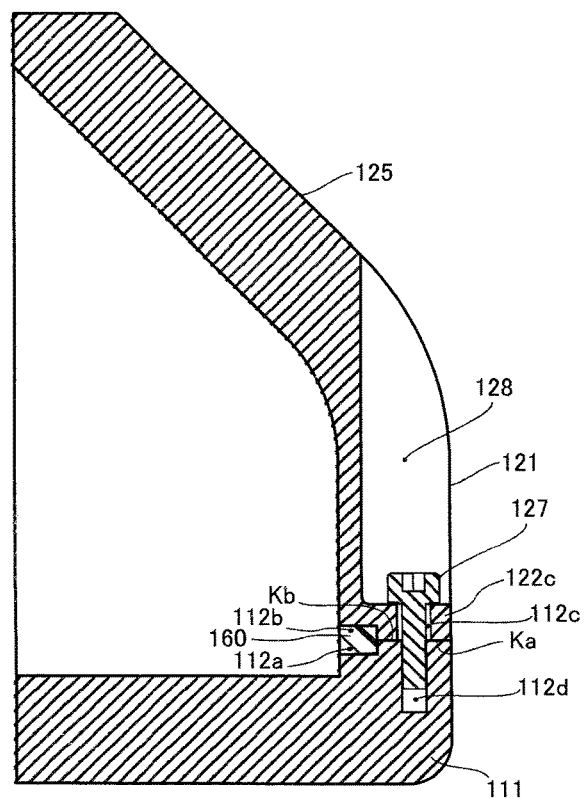
FIG. 8B is an arrow sectional view of FIG. 8A.

FIG. 4A illustrates a partial cutaway view of the housing 101 and FIG. 4B illustrates an arrow sectional view of FIG. 4A. Steps are provided in the edge portions Ka of the housing body 110 and the edge portions Kb of the cover 120 along the thickness direction so as to face outward in such a manner that a gap that has a predetermined width is created while the edge portions Ka of the housing body 110 are in contact with the edge portions Kb of the cover 120. With the steps, endless grooves 112a, 112b are created in the edge portions Ka of the housing body 110 and the edge portions Kb of the cover 120, respectively, along the edge direction on the outside from a screw 127. Note that a groove may be provided only in one of the edge portion Ka of the housing body 110 and the edge portion Kb of the cover 120, and the other may be flat.

A gasket 160 is fit into the grooves 112a, 112b as an endless elastic member (rubber member). In a steady state in which the gasket 160 is not subjected to an external pressure, the thickness of the gasket 160 is slightly larger than the total of the depth of the groove 112a and the depth of the groove 112b. When the cover 120 is brought into close contact with the housing body 110, the gasket 160 is compressed in the thickness direction and press fit between the grooves 112a and 112b, so that sealability is secured by its restoring force.

Linear grooves 128 through which a screw driver (not illustrated) or a screw 127 is passed along its plane direction is formed in, for example, 6 locations: where the rear end plate 121 of the cover 120 and the pair of side plates 122, 123 are joined; where the top plate 124 and the pair of side plates 122, 123 are joined; the midpoint of the rear end plate 121; and the midpoint of the top plate 124, and a flange 122c provided with a screw through hole 112c is provided in the bottom of the linear groove 128. A threaded screw hole 112d is formed in the edge portion Ka of the housing body 110 opposite to the screw through hole 112c. Fastening the screw 127 into the screw hole 112d brings the edge portions Ka and Kb into close contact with each other and compresses the gasket 160. In this way, the housing body 110 and the cover 120 are joined air-tight on their outside via the gasket 160, and the edge portions Ka and Kb are in direct contact with each other on the inside from the screw 127.

When the housing body 110 and the cover 120 are both formed of metal, metal touch is achieved inside and air tightness is secured outside by the gasket 160. In this structure, a side surface of the gasket 160 is exposed to the external environment to avoid metal-touch part connection, which is unacceptable for food manufacturing lines, as much as possible, so that it is possible to prevent bacteria or the like from propagating in the gap. More preferably, the screw 127 is inserted in a rubber bush. In this way, metal-touch part connection between the screw 127 and the flange 122c is also avoided. Accordingly, the articulated robot can be used for food manufacturing lines.

As described above, by cutting away edge portions Ka of the pair of side plates 112, 113 in a curved concave shape, it is possible to enlarge the opening K in the housing body 110. When the cover 120 is removed, the electromechanical or mechanical component contained in or attached to the housing body 110 can be largely exposed. In this way, during replacement of parts or maintenance, a tool or a hand of an operator can easily be inserted and thus working efficiency can be improved.

Since the edge portions Ka of the housing body 110 and the edge portions Kb of the cover 120 are curved in such a manner that the edge portions match with each other, the housing body 110 and the cover 120 can easily be aligned, and misalignment or a gap is less likely to occur. Working efficiency for fastening screws or the like is also improved.

In the case in which the articulated robot apparatus is not used for food manufacturing lines, the material of the cover 120 is relatively arbitrary. For example, the weight of the joint mechanism 100 can be reduced when the housing body 110 is made of metal to maintain the strength and the cover 120 is made of resin material. The weight reduction of the joint mechanism 100 allows reduction in strength of portions of the articulated robot or output power of motors, which contributes to downsizing and energy saving.

Since the front plate 115 and the pair of side plates 112, 113 are connected to three sides of the bottom plate 111, and the front plate 115 and the pair of side plates 112, 113 are connected with the top plate 114, it is possible to secure rigidity of the housing body 110 as a boxy body.

In the above described structure, the screw 127 is arranged inside and the gasket 160 is arranged outside. However, as illustrated in FIGS. 5 to 8B, the screw 127 may be arranged outside and the gasket 160 may be arranged inside in another structure. In such a structure, the edge portions Ka of the housing body 110 and the edge portions Kb of the cover 120 constitute metal touch with respect to the external environment, which is however sealed by the gasket 160 at the innermost. Depending on uses of the articulated robot, such a structure may be preferable.

Second Embodiment

Figure 9:
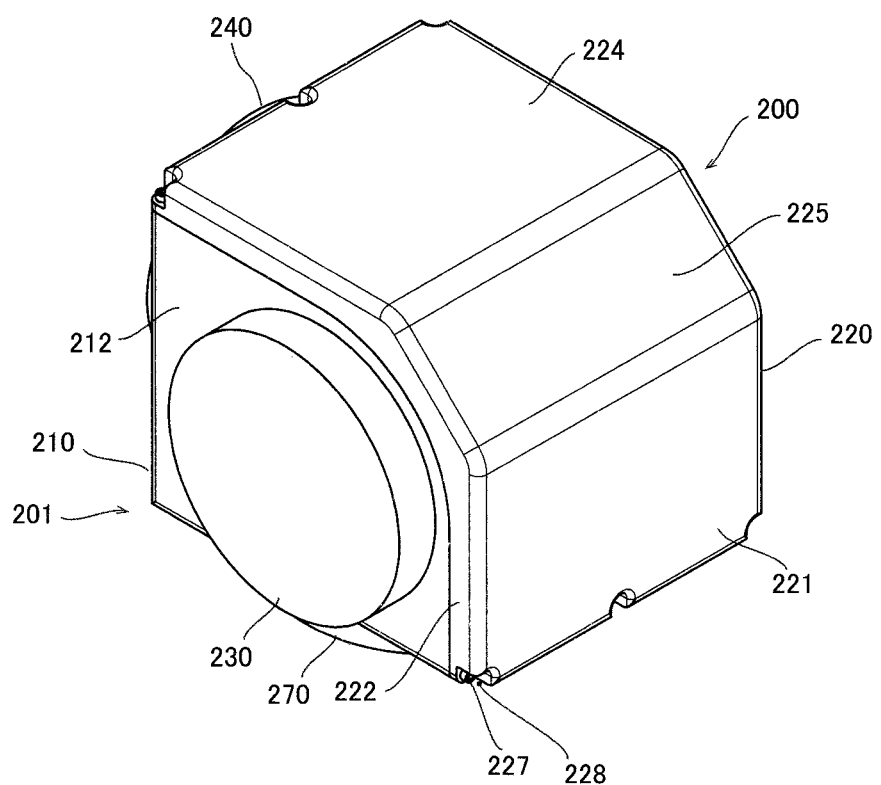
FIG. 9 is a perspective view illustrating a joint mechanism according to a second embodiment.
Figure 10:
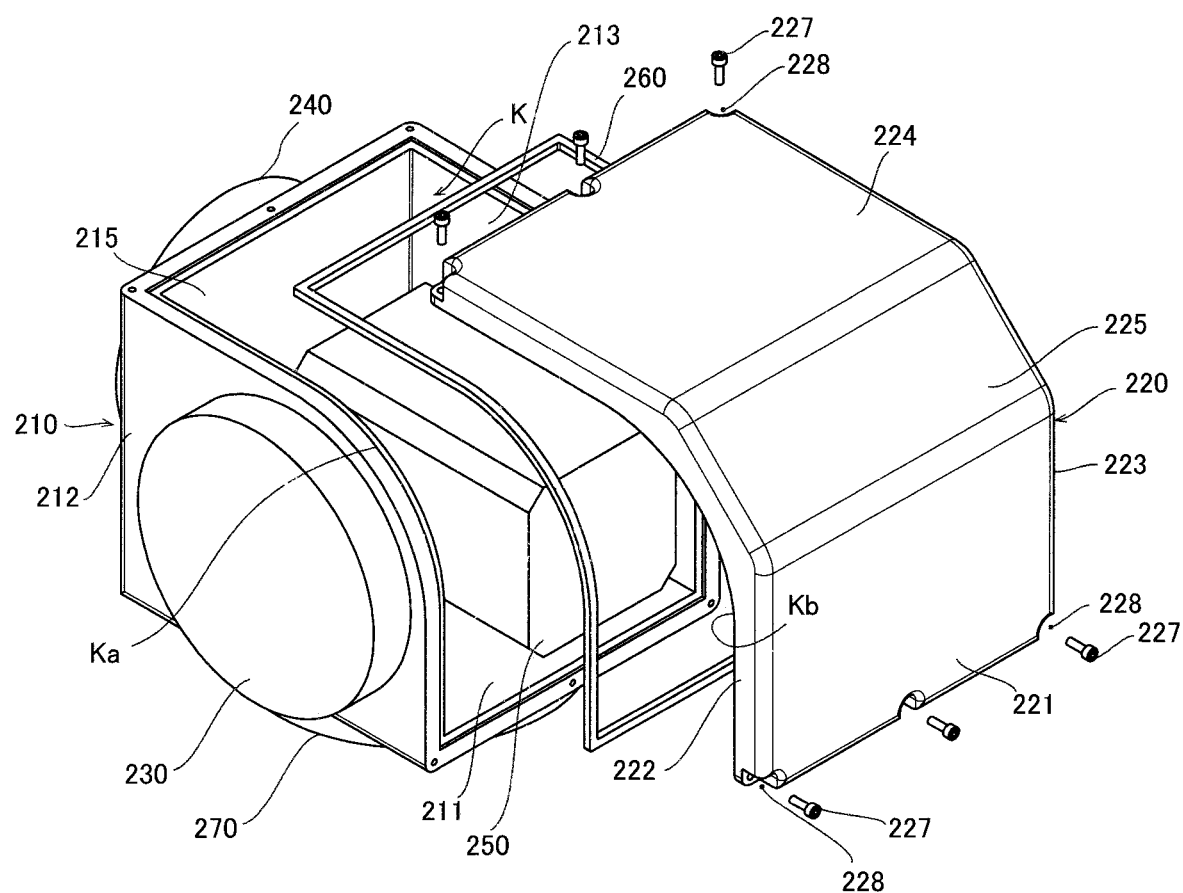
FIG. 10 is an exploded view of a housing in FIG. 9.
Figure 11:
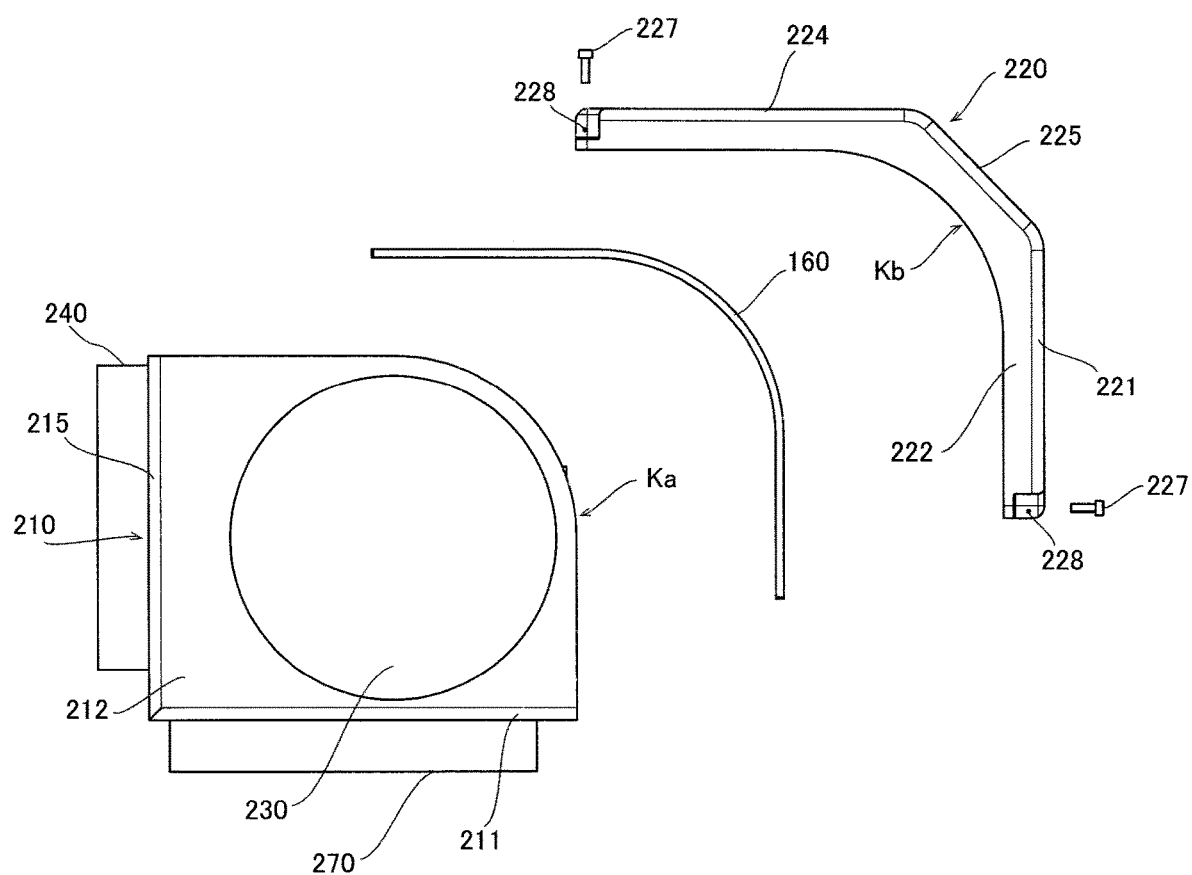
FIG. 11 is a side view of the housing in FIG. 10.
Figure 12A:
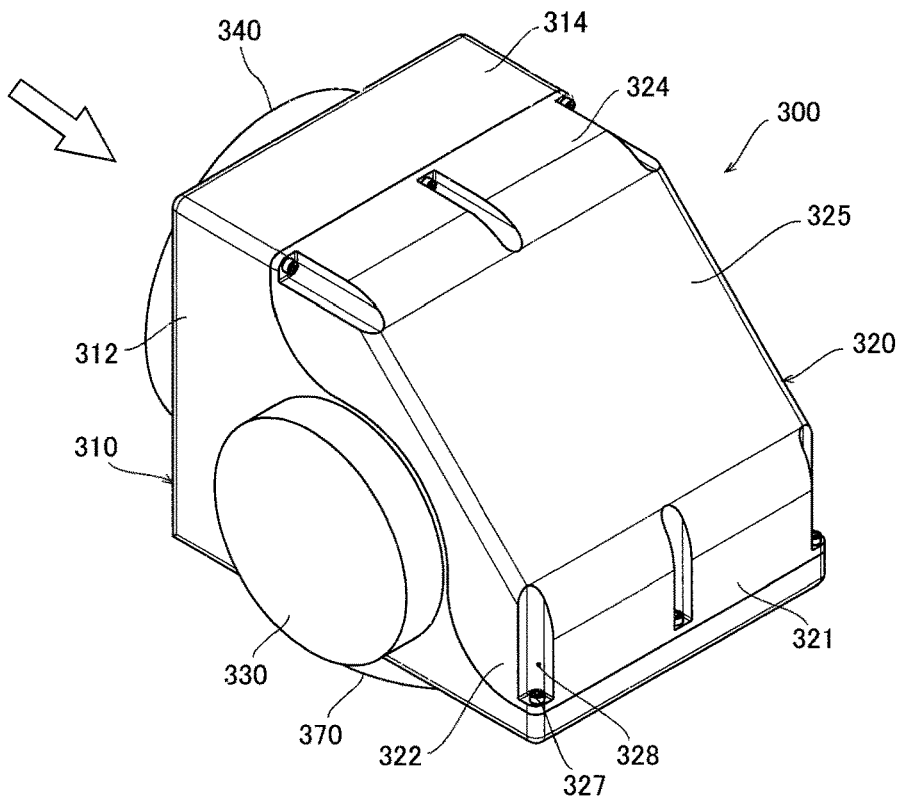
FIG. 12A is a perspective view of a joint mechanism according to a third embodiment.
Figure 12B:
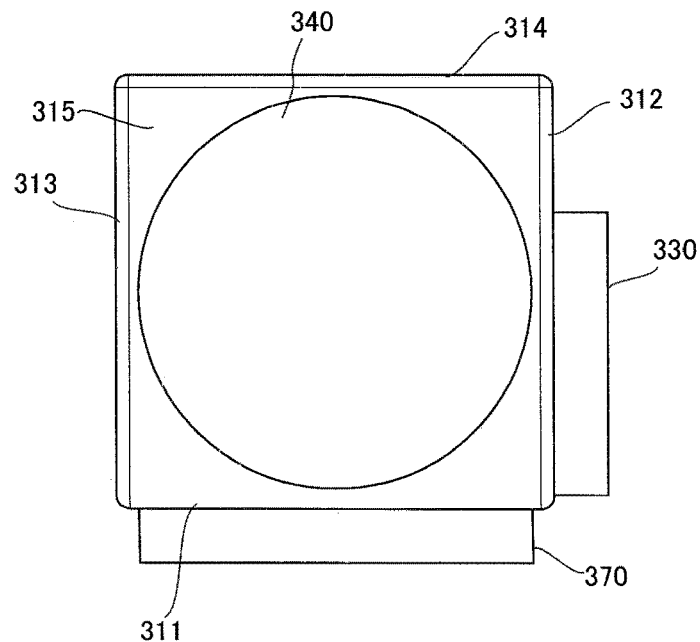
FIG. 12B is an arrow view of FIG. 12A.
Figure 13:
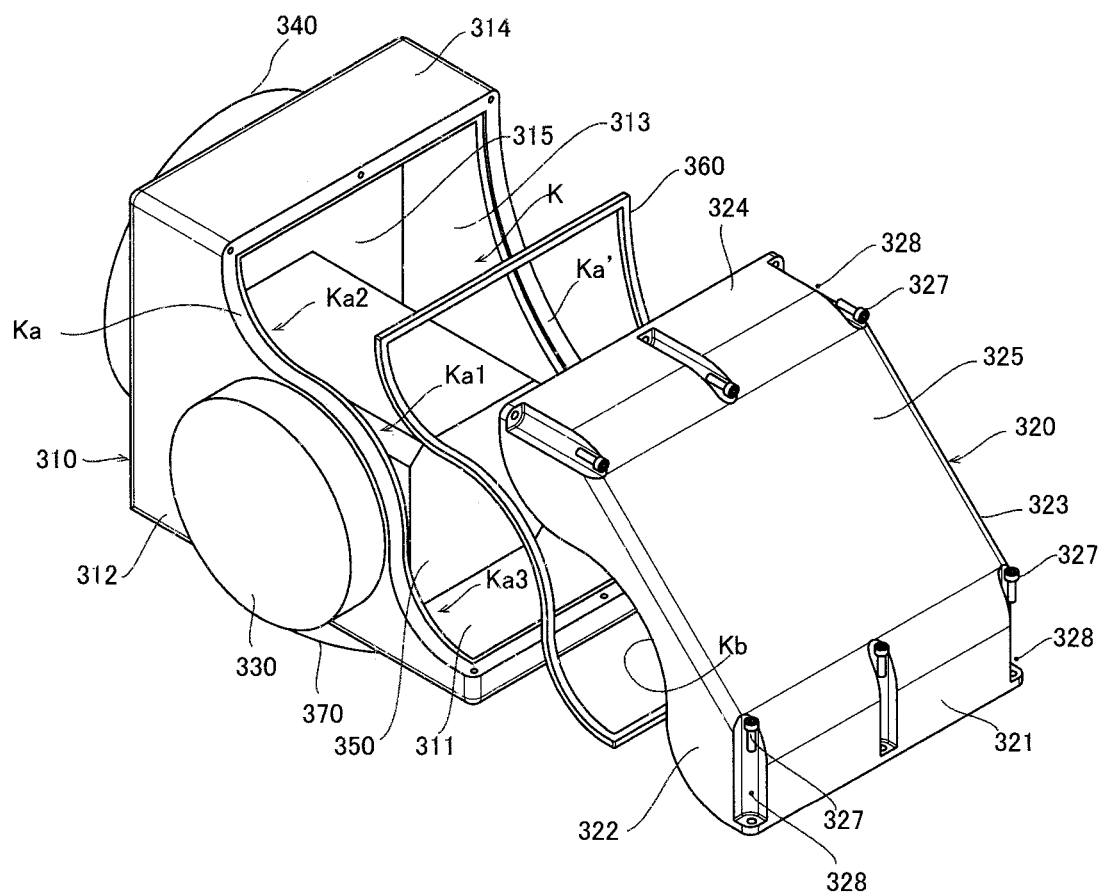
FIG. 13 is an exploded view of a housing in FIG. 12A.
Figure 14A:
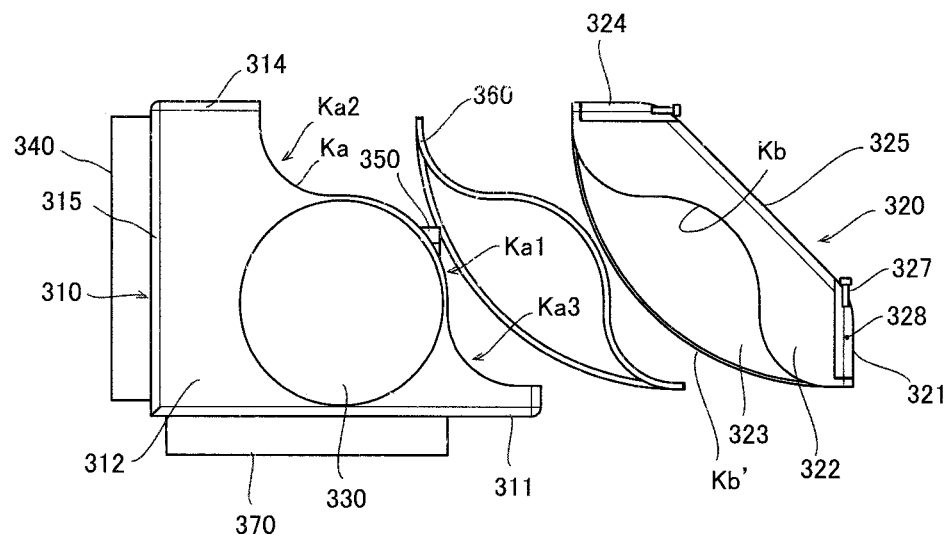
FIG. 14A is a right side view of the housing in FIG. 13.
Figure 14B:
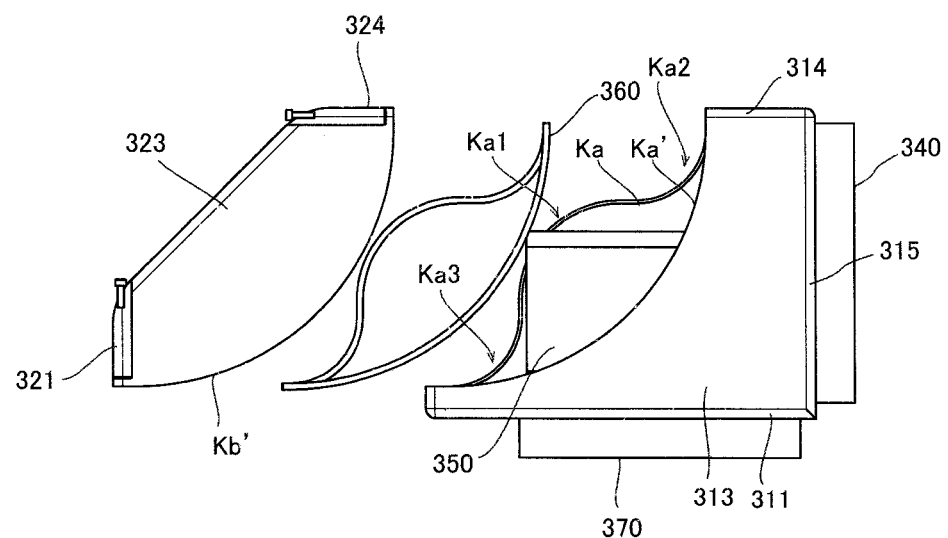
FIG. 14B is a left side view of the housing in FIG. 13.

FIGS. 9 to 11 illustrate a joint mechanism according to a second embodiment. In the structure in the first embodiment, the edge portions Ka of the side plates 112, 113 of the housing body 110 are cut away toward the bottom plate 111 in a large arcuate shape. In the embodiment, since a joint constituting member 230 is attached to a side plate 212 of a housing body 210, such a structure, in which an edge portion Ka of the side plate 212 is cut away toward a bottom plate 211 in a large arcuate shape, cannot be adopted. However, to enlarge the opening K of a housing body 210 when a cover 220 of the housing body 210 is removed, a structure as described below is provided. A detailed description will be as follows.

A housing 201 of a joint mechanism 200 consists of a housing body 210 and a cover 220, and the housing body 210 includes a rectangular bottom plate 211. A front plate 215 and a pair of side plates 212, 213 are connected to three sides of the bottom plate 211. A joint constituting member 270 such as a bearing, which is a mechanical component, and a motor 250 as an electromechanical component are attached to the bottom plate 211. A joint constituting member 240 is attached to the front plate 215, and additionally a joint constituting member 230 is attached to the side plate 212.

The edge portion Ka of the side plate 212 is not linear and has a curved, and not acute, shape along the outline of the joint constituting member 230 attached to the side plate 212 in such a manner that the joint constituting member is surrounded.

The cover 220 has a shape that matches with the opening K of the housing body 210 and the edge portions Ka. A rear end plate 221, a pair of side plates 222, 223, and a top plate 224 are connected to a rectangular and planar oblique plate 225. Edge portions Kb of the pair of side plates 222, 223 has a curved concave shape that matches with the edge portions Ka of the pair of side plates 212, 213 of the housing body 210.

An endless gasket 260 is interposed between the edge portions Ka of the bottom plate 211, the top plate 214, and the pair of side plates 212, 213 of the housing body 210 and the edge portions Kb of the rear end plate 221, the pair of side plates 222, 223, and the top plate 224 of the cover 220 to secure air tightness inside the housing 201.

The sealing structure by means of a gasket 260 and the connecting structure are similar to those of the first embodiment. Grooves are endlessly formed in the edge portions Ka of the housing body 210 and the edge portions Kb of the cover 220, respectively, along the edge direction on the inside or outside from the screw 227 in such a manner that a gap that has a predetermined width is created while the edge portions Ka of the housing body 210 are in contact with the edge portions Kb of cover 220. The gasket 260 that is an endless elastic member (made of rubber) is fit between the grooves. In an unloaded steady state, the thickness of the gasket 260 is slightly larger than the total depth of the grooves. When the housing body 210 is in close contact with the cover 220, the gasket 260 is compressed in the thickness direction and press fit between the grooves, so that sealability is secured by its restoring force.

Linear grooves 228 through which a screw driver (not illustrated) or a screw 227 is passed along its plane direction is formed on opposite sides and in the center of both the rear end plate 221 and the top plate 224 of the cover 220. The screw 227 is inserted through a screw through hole in a flange in the bottom of the linear groove 228 and fastened in a screw hole in the edge portions Ka of the opposing housing body 210. In this way, the edge portions Ka and Kb are brought into close contact with each other and the gasket 260 is compressed. The housing body 210 and the cover 220 are joined air-tight via the gasket 260, and the edge portions Ka and Kb are in direct contact with each other on the inside or outside from the screw 227.

In the embodiment, as with the first embodiment, the opening K of the housing body 210 can be enlarged to largely expose the electromechanical or mechanical component, so that workability can be improved for replacement of parts or maintenance. The housing body 210 and the cover 220 can easily be aligned, and misalignment or a gap is less likely to occur. Working efficiency for fastening screws or the like is also improved. Other similar effects to the first embodiment may be produced.

Third Embodiment

FIGS. 12A to 14B illustrate a joint mechanism according to a third embodiment. In the structure in the first embodiment, the edge portions Ka of the side plates 112, 113 of the housing body 110 are cut away toward the bottom plate 111 in a large arcuate shape. In the embodiment, since a joint constituting member 330 is attached to a side plate 312 of a housing body 310, such a structure, in which an edge portion Ka of the side plate 312 is cut away toward a bottom plate 311 in a large arcuate shape, cannot be adopted. However, to enlarge the opening K of a housing body 310 when a cover 320 of the housing body 310 is removed, a structure as described below is provided. A detailed description will be as follows.

A housing 301 of a joint mechanism 300 consists of a housing body 310 and a cover 320, and the housing body 310 includes a rectangular bottom plate 311. A front plate 315 and a pair of side plates 312, 313 are connected to three sides of the bottom plate 311. A narrow strip-shaped top plate 314 is connected to the top sides of the pair of side plates 312, 313. A joint constituting member 370 such as a bearing, which is a mechanical component, and a motor 350 as an electromechanical component are attached to the bottom plate 311. A joint constituting member 340 is attached to the front plate 315, and additionally a joint constituting member 330 is attached to the side plate 312. No joint constituting member, electrical component such as a motor, nor mechanical component is attached to the other side plate 313. An edge portion Ka' of the side plate 313 is cut away toward the bottom plate 311 in a large arcuate shape, as with the side plate 113 in the first embodiment.

An edge portion Ka of the side plate 312 is not linear and is shaped such that a curved convex-shaped portion Ka1 protruding along the outline of the joint constituting member 330 attached to the side plate 312 in such a manner that the joint constituting member is surrounded is continuously connected to cut-away curved concave-shaped portions Ka2, Ka3 on opposite sides of the portion Ka1.

The cover 320 has a shape that matches with the opening K of the housing body 310 and the entire edge portions. A rear end plate 321, a pair of side plates 322, 323, and a top plate 324 are connected to a rectangular and planar oblique plate 325. Edge portions Kb, Kb' of the pair of side plates 322, 323 have the respective curved shapes that match with the edge portions Ka, Ka' of the pair of side plates 312, 313 of the housing body 310.

An endless gasket 360 is interposed between the entire edge portions of the bottom plate 311, the top plate 314, and the pair of side plates 312, 313 of the housing body 310 and the entire edge portions of the rear end plate 321, the pair of side plates 322, 323, and the top plate 324 of the cover 320 to secure air tightness inside the housing 301.

The sealing structure by means of a gasket 360 and the connecting structure are similar to those of the first embodiment. Grooves are endlessly formed in the edge portions Ka of the housing body 310 and the edge portions Kb of the cover 320, respectively, along the edge direction on the inside or outside from the screw 327 in such a manner that a gap that has a predetermined width is created while the edge portions of the housing body 310 are in contact with the edge portions of cover 320. The gasket 360 that is an endless elastic member (made of rubber) is fit between the grooves. In an unloaded steady state, the thickness of the gasket 360 is slightly larger than the total depth of the grooves. When the housing body 310 is in close contact with the cover 320, the gasket 360 is compressed in the thickness direction and press fit between the grooves, so that sealability is secured by its restoring force.

Linear grooves 328 through which a screw driver (not illustrated) or a screw 327 is passed along its plane direction is formed on opposite sides and in the center of both the rear end plate 321 and the top plate 324 of the cover 320. The screw 327 is inserted through a screw through hole in a flange in the bottom of the linear groove 328 and fastened in a screw hole in the edge portions Ka of the opposing housing body 310. In this way, the edge portions Ka and Kb are brought into close contact with each other and the gasket 360 is compressed. The housing body 310 and the cover 320 are joined air-tight via the gasket 360, and the edge portions Ka and Kb are in direct contact with each other on the inside or outside from the screw 327. The lengths of Ka and Ka' may be the same as each other to allow the gasket 360 to lie flat.

In the embodiment, as with the first embodiment, the opening K of the housing body 310 can be enlarged to largely expose the electromechanical or mechanical component, so that workability can be improved for replacement of parts or maintenance. The housing body 310 and the cover 320 can easily be aligned, and misalignment or a gap is less likely to occur. Working efficiency for fastening screws or the like is also improved. In addition, similar effects to the first embodiment may be produced, such as an ability to secure rigidity of the housing body 310 as a boxy body.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A housing comprising:
a housing body that contains at least one electromechanical or mechanical component, the housing body including a front plate and a pair of side plates, the plates being connected to a bottom plate in such a manner that the housing body includes an opening;
a cover for closing the opening; and
a gasket interposed between an edge portion of the housing body and an edge portion of the cover to tightly close an inside of the housing body,
wherein
an entire edge portion of each of the side plates has a curved shape;
the component is attached to at least one of the side plates; and
the edge portion of at least one of the side plates has a curved shape along an outline of the component.

2. The housing according to claim 1, wherein the edge portion of each of the side plates has a concave-shaped curved portion cut away toward the bottom plate.

3. The housing according to claim 2,
wherein an edge portion of the cover has a convex-shaped curved portion matches with the concave-shaped curved portion.

4. The housing according to claim 3,
wherein each of the curved convex-shaped curved portion and the concave-shaped curved portion is an arcuate shape.

5. The housing according to claim 1, wherein
the component is attached to at least one of the side plates, and
the edge portion of at least one of the side plates has a continuous shape of a curved convex-shaped portion and a concave-shaped portion cut away toward the bottom plate along an outline of the component.

6. The housing according to claim 1, wherein
the component is attached to one of the side plates,
the edge portion of one of the side plates has a continuous shape of a curved convex-shaped portion and a concave-shaped portion cut away toward the bottom plate along an outline of the component, and
the edge portion of another of the side plates has a concave-shaped curved portion cut away toward the bottom plate.

7. The housing according to claim 1, wherein
the housing body is made of metal, and
the cover is made of resin material.

8. The housing according to claim 1, wherein the gasket is cut out from a planar sheet.

9. A housing comprising:
a housing body that contains at least one electromechanical or mechanical component, the housing body including a front plate and a pair of side plates, the plates being connected to a bottom plate in such a manner that the housing body includes an opening;
a cover for closing the opening; and
a gasket interposed between an edge portion of the housing body and an edge portion of the cover to tightly close an inside of the housing body,
wherein
an entire edge portion of each of the side plates has a curved shape;
a step is provided on at least one of the edge portion of the housing body and the edge portion of the cover in a thickness direction in such a manner that a gap having a predetermined width is formed while the edge portion of the housing body is in contact with the edge portion of the cover;
the gasket is press fit into the gap; and
a steady-state thickness of the gasket is larger than the width of the gap.

10. The housing according to claim 9, wherein
the gap is formed on an outside of the housing body, and
the housing body and the cover are connected together with a screw on an inside from the gap.

11. The housing according to claim 9, wherein
the gap is formed on an inside of the housing body, and
the housing body and the cover are connected together with a screw on an outside from the gap.

12. A joint mechanism for coupling links, comprising:
- a housing body including a front plate and a pair of side plates, the plates being connected to a bottom plate in such a manner that the housing body includes an opening;
- a cover for closing the opening;
- at least one electromechanical or mechanical component that is either contained in the housing body or attached to any of the side plates; and
- a gasket interposed between an edge portion of the housing body and an edge portion of the cover to tightly close an inside of the housing body, wherein an entire edge portion of each of the side plates has a curved shape;

the component is attached to at least one of the side plates; and the edge portion of at least one of the side plates has a curved shape along an outline of the component.

\* \* \* \* \*